United States Patent
Sharma et al.

(10) Patent No.: US 11,652,357 B1
(45) Date of Patent: May 16, 2023

(54) CONTROLLER, SYSTEM AND METHOD FOR CONTROLLING DISCHARGE OF HETEROGENEOUS BATTERY PACKS

(71) Applicants: China Energy Investment Corporation Limited, Beijing (CN); National Institute of Clean-and-Low-Carbon Energy, Beijing (CN)

(72) Inventors: Ratnesh Sharma, Fremont, CA (US); Surinder Singh, Fremont, CA (US); Brandon Ohara, Mountain View, CA (US)

(73) Assignees: China Energy Investment Corporation Limited, Beijing (CN); National Institute of Clean-and-Low Carbon Energy, Beijing (CN)

( * ) Notice: Subject to any disclaimer, the term of this patent is extended or adjusted under 35 U.S.C. 154(b) by 56 days.

(21) Appl. No.: 17/511,806

(22) Filed: Oct. 27, 2021

(51) Int. Cl.
*H02J 7/00* (2006.01)
*H02M 7/44* (2006.01)

(52) U.S. Cl.
CPC ........ *H02J 7/00712* (2020.01); *H02J 7/0047* (2013.01); *H02J 7/0063* (2013.01); *H02M 7/44* (2013.01)

(58) Field of Classification Search
None
See application file for complete search history.

(56) References Cited

U.S. PATENT DOCUMENTS

| | | | |
|---|---|---|---|
| 7,971,345 B2 | 7/2011 | Okumura et al. | |
| 2010/0285339 A1 | 11/2010 | Chaturvedi et al. | |
| 2012/0299548 A1* | 11/2012 | Takahashi | H01M 50/209 320/117 |
| 2014/0139188 A1* | 5/2014 | Yonezawa | H02J 7/0047 320/134 |
| 2020/0303929 A1* | 9/2020 | Watanabe | H02J 7/0013 |
| 2022/0285950 A1* | 9/2022 | Ju | H02J 7/00712 |

FOREIGN PATENT DOCUMENTS

| | | |
|---|---|---|
| AU | 2018236771 B2 | 10/2018 |
| CN | 104935045 B | 9/2015 |
| CN | 110518667 A | 11/2019 |
| EP | 2555311 B1 | 2/2016 |

\* cited by examiner

*Primary Examiner* — Jared Fureman
*Assistant Examiner* — Aqeel H Bukhari
(74) *Attorney, Agent, or Firm* — Calfee, Halter & Griswold LLP

(57) ABSTRACT

A controller, a system including such a controller, and a method for controlling discharging of a plurality of battery packs are provided. The controller includes one or more processor and at least one tangible, non-transitory machine readable medium encoded with one or more programs configured to perform steps to determine a respective discharge power or discharge share for each battery pack for maximizing objective function (J) of the plurality of battery packs defined in Equation (1). The controller provides signals with instructions to the plurality of battery packs and/or the one or more power converters for discharging power from the plurality of battery packs based on the respective discharging share and power of each battery pack and/or keeping a certain battery pack idle.

20 Claims, 6 Drawing Sheets

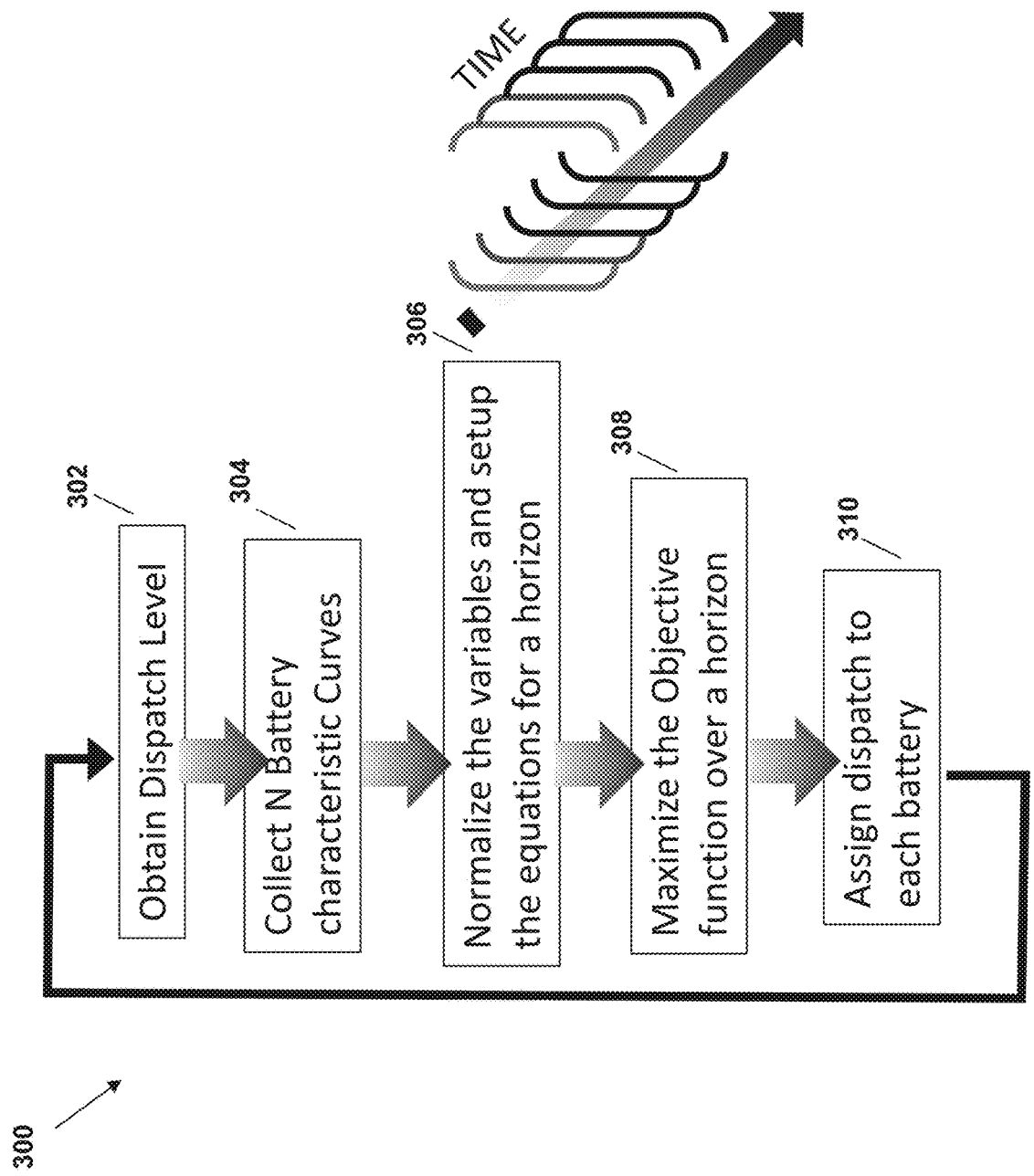

CONTROLLER, SYSTEM AND METHOD FOR CONTROLLING DISCHARGE OF HETEROGENEOUS BATTERY PACKS

PRIORITY CLAIM AND CROSS-REFERENCE

None.

FIELD OF THE INVENTION

The disclosure relates to systems and methods for controlling battery packs generally. More particularly, the disclosed subject matter relates to a controller, a system, and a method for controlling discharge of battery packs, for example, in energy storage application.

BACKGROUND

Clean and renewable sources of energy become more important due to increased concerns about environmental issues such as global warming. Such sources include solar and wind power, and rechargeable battery. Renewable energy sources are intermittent because they cannot always be dispatched when needed to meet the changing requirements of energy consumers. Energy storage systems are expected to solve this flexibility challenge. A stationary energy storage system can store energy and release energy in the form of electricity when it is needed.

SUMMARY OF THE INVENTION

The present disclosure provides a controller for controlling discharge of heterogeneous battery packs, a system such as an electrical energy storage system comprising such a controller, and methods of using the same.

In accordance with some embodiments, a system comprises a plurality of battery packs, one or more power converters, and one or more controller. Each power converter is coupled with at least one of the plurality of battery packs, and is configured to convert direct current (DC) from one battery pack to alternating current (AC) or vice versa. The controller is coupled to the plurality of battery packs and the one or more power converters. In some embodiments, the system may also include more than one controller, and each controller is coupled to a plurality of battery packs.

The plurality of battery packs are defined and described herein. In some embodiments, the plurality packs are heterogeneous battery packs, which can be selected from new batteries, second-use electric vehicle (EV) batteries, or combinations thereof. The plurality of battery packs are connected in parallel, in series, or in a combination (i.e. hybrid combinations) thereof. In some embodiments, the plurality of battery packs are connected in parallel.

The controller comprises one or more processors and at least one tangible, non-transitory machine readable medium encoded with one or more programs configured to perform steps for controlling a discharging process of the system having the plurality of battery packs. In some embodiments, these steps include: receiving a total power demand (D) needed to be dispatched from the system in a first time interval, and collecting characteristic data of each battery pack to establish a plurality of curves of voltage (V) versus charge (Q) at a plurality of discharge rates for each battery pack (i). Each curve of voltage versus charge corresponds to a respective discharge rate for a respective battery pack. The characteristic data of each battery pack include a maximum voltage ($V_{i\ max}$), a minimum voltage for discharge ($V_{i\ min}$), a maximum discharge ($Q_{i\ max}$) and a minimum discharge ($V_{i\ min}$) at a respective discharge rate. The characteristic data of each battery pack also include a maximum total rated power ($d_{i\ max}$), state of charge ($SOC_i$) and a present voltage ($V_i$).

The steps further include determining a respective discharge power (di) or discharge share ($w_i$) for each battery pack for maximizing objective function (J) of the plurality of battery packs defined in Equation (1):

$$J = \sum_i^n \alpha V_i^* + \sum_i^n (1-\alpha) \cdot SOC_i \cdot (\nabla V_i^*)^{-1}. \tag{1}$$

In Equation (1), n is a total number of the plurality of battery packs. $V_i^*$ is a voltage distribution parameter of each battery pack determined using Equation (2):

$$V_i^* = (V_i - V_{i\ min})/(V_{i\ max} - V_{i\ min}) \tag{2}$$

$\nabla V_i^*$ is a normalized voltage gradient in a respective curve of voltage versus charge normalized by ($V_{i\ max} - V_{i\ min}$) and ($Q_{i\ max} - Q_{i\ min}$), and $\alpha$ is a weighting factor in a range of from 0 to 1 assigned between voltage and voltage gradient.

In some embodiments, the controller is configured to determine a respective discharge power (di) or discharge share ($w_i$) for each battery pack for maximizing objective function (J) of the plurality of battery packs through steps of:

(a) assigning a first set of power distribution including a respective first discharge power or discharge share for each battery pack;

(b) determining a respective voltage distribution parameter ($V_i^*$) of each battery pack based on $V_{i\ max}$, $V_{i\ min}$, and $V_i$ at a corresponding discharge rate based on Equation (2);

(c) calculating a respective normalized voltage gradient ($\nabla V_i^*$) of each battery pack based on a respective curve of voltage versus charge at the corresponding discharge rate;

(d) calculating the objective function (J);

(e) repeating steps (a)-(d) until the objective function (J) is maximized, by assigning a second set of power distribution including a respective second discharge power or discharge share for each battery pack, the second set of power distribution different from the first set of power distribution; and (f) providing the respective discharge power (di) or discharge share ($w_i$) for each battery pack for maximizing objective function (J) of the plurality of battery packs.

In some embodiments, a respective discharge power or discharge share for each battery pack is assigned or calculated based on either or both of Equation (3) and Equation (4):

$$w_i = \frac{d_{i,max} \cdot V_i^*}{\sum d_{i,max} \cdot V_i^*}; \tag{3}$$

and $$d_i = w_i D \tag{4}$$

In some embodiments, a respective normalized voltage gradient ($\nabla V_i^*$) of each battery pack is calculated according to Equation (5):

$$(\nabla V_i^*) = (|V_1 - V_2|/|V_{max} - V_{min}|)/(|Q_1 - Q_2|/|Q_{max} - Q_{min}|) \tag{5}$$

wherein $V_1$, $V_2$, $Q_1$, and $Q_2$ are voltage and charge at a first point and a second point of a respective curve of voltage versus charge.

The steps also include providing signals with instructions to the plurality of battery packs and the one or more power converters for discharging power from the plurality of battery packs based on the respective discharge power (di) or discharge share ($w_i$) of each battery pack and/or keeping a certain battery pack idle. The controller is configured to provide the signals with the instructions to the plurality of battery packs and the one or more power converters. The power is then discharged from the plurality of battery packs.

When the calculated discharging power or share of a certain battery pack is about zero, or such a battery cannot be used to discharge to meet the required conditions because its voltage is below its minimum voltage for discharging (i.e., having a voltage collapse), the specific battery pack is kept idle without discharging. Such a battery pack may need to be charged first or replaced.

In some embodiments, the controller is configured to repeat the steps to re-determine the respective power discharge for each battery pack in a second time interval after the first time interval ends or when a voltage collapse occurs to a battery pack, by repeating the steps described above. In some embodiments, the controller is also configured to dynamically control discharging of the plurality of battery packs by updating the respective discharge power or share, or discharge rate of each battery pack instantaneously with time. In some embodiments, the controller is configured to discharge power from the plurality of battery packs to a grid or load.

The system may optionally further comprise one or more battery power management unit (BPMU). Each BPMU may be connected with one or more battery packs, and is configured to monitor the one or more battery packs and provide characteristic data of the one or more battery packs to the controller.

In some embodiments, the system is an electrical energy storage system. The total power demand is provided from an upper level energy management system (EMS). In some embodiments, the controller is configured to discharge power from the plurality of battery packs to a grid or load. In some embodiments, the grid is optional. The power can be discharged to other components, in which electrical power is needed.

In another aspect, the present disclosure provides a controller for controlling discharge of a system comprising a plurality of battery packs. As described herein, such a controller comprises one or more processor and at least one tangible, non-transitory machine readable medium encoded with one or more programs configured to perform the steps as described herein. The controller is configured to perform the steps as described herein to determine a respective discharge power (di) or discharge share ($w_i$) for each battery pack for maximizing objective function (J) of the plurality of battery packs.

The controller is configured to provide signals with instructions to the plurality of battery packs and the one or more power converters for discharging power from the plurality of battery packs based on the respective discharge power of each battery pack and/or keeping a certain battery pack idle. The controller is also configured to dynamically control discharging of the plurality of battery packs by updating the respective discharging share or power of each battery pack instantaneously with time.

The plurality of battery packs, which the controller is configured to be coupled with, are heterogeneous battery packs selected from new batteries, second-use electric vehicle (EV) batteries, or combinations thereof. The plurality of battery packs are connected in parallel, in series, or in a combination thereof. The controller is configured for controlling discharge of heterogeneous battery packs, for example, in an electrical energy storage system. In some embodiments, the controller is configured to optionally discharge power from the plurality of battery packs to a grid or load.

In another aspect, the present disclosure provides a method for controlling discharge of a system comprising a plurality of battery packs through a controller therein as described herein. The method includes the steps as described herein. In such a method, a respective discharge power (di) or discharge share ($w_i$) for each battery pack in a time interval is determined by maximizing objective function (J) of the plurality of battery packs as described above.

In such a method, the controller also provides signals with instructions to the plurality of battery packs and the one or more power converters for discharging power from the plurality of battery packs based on the respective discharge power of each battery pack and/or keeping a certain battery pack idle as described herein. The power is then discharged from the plurality of battery packs according to the instructions. In some embodiments, instructions are sent from the controller to each battery pack and/or one or more converter connected with the plurality of battery packs for discharging based on the respective discharge power or share of each battery pack.

The plurality of battery packs are heterogeneous battery packs selected from new batteries, second-use electric vehicle (EV) batteries, or combinations thereof. The plurality of battery packs are connected in parallel, in series, or in a combination thereof.

In some embodiments, some or all the steps above are repeated to re-assign dispatch for the plurality of battery packs after a pre-determined time interval ends or when a voltage collapse occurs to a battery pack. In some embodiments, the discharging process of the plurality of battery packs is dynamically controlled by updating the respective discharging power or share of each battery pack instantaneously with time.

The system, the controller, and the method provided in the present disclosure offer many advantages. For example, a variety of new and used battery packs having different quality can be used. No pre-selection or dismantle of the battery packs are needed. The plurality of heterogeneous battery packs collectively supply power load to satisfy the power demand while each battery pack may discharge at a different share or rate. The system, the controller, and the method extend the life of each battery packs, and they also offer flexibility in maintaining and upgrading the system as well.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

FIGS. 6A-6B illustrates an exemplary program including general steps (FIG. 6A) for dynamically controlling discharge of battery packs in different time intervals (FIG. 6B) in accordance with some embodiments.

DETAILED DESCRIPTION

Figure 1:
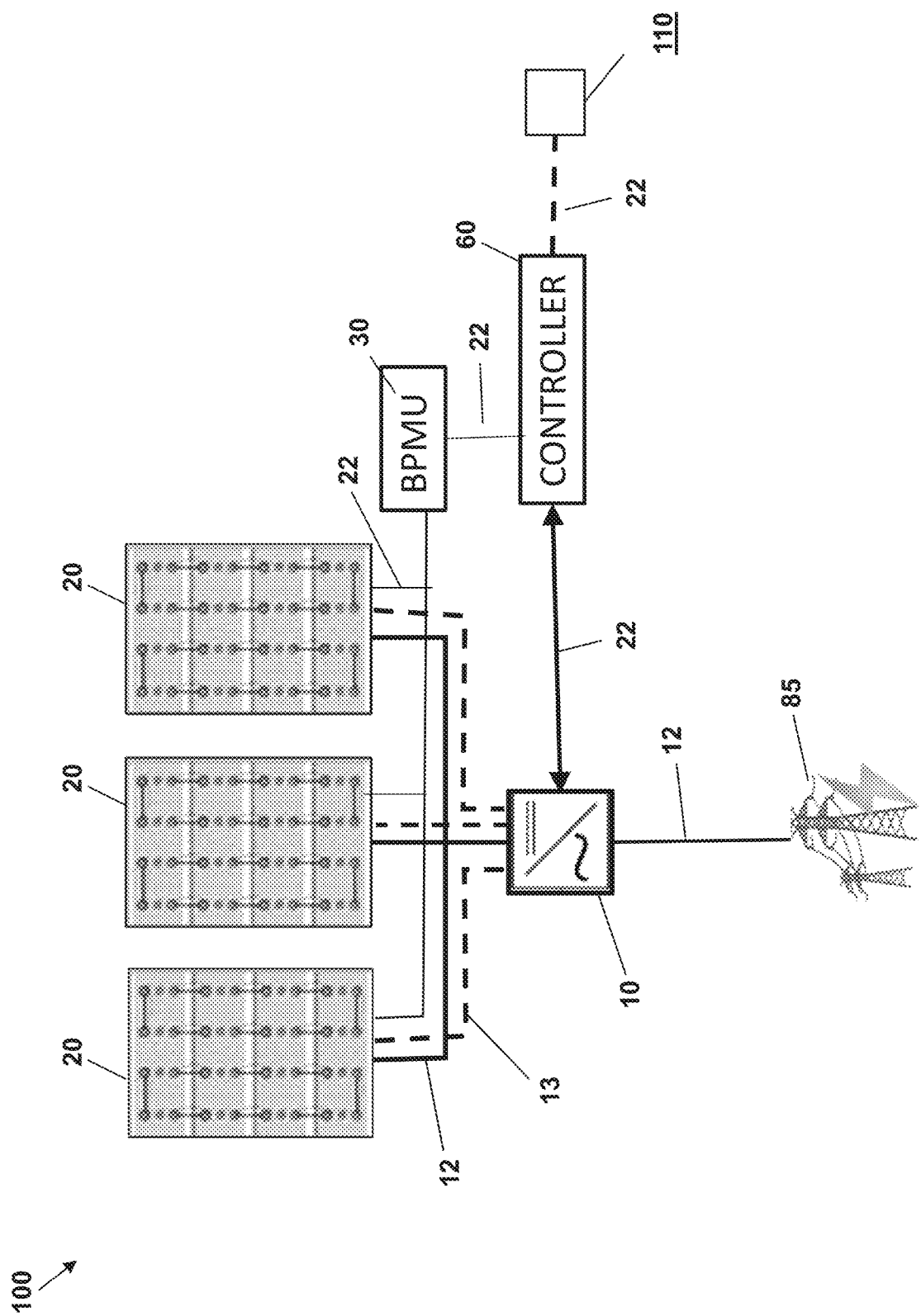
FIG. 1 is a block diagram illustrating an exemplary system comprising heterogeneous battery packs and a controller in accordance with some embodiments.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

U.S. Patent Application Publication No. 2010/0285339A1 discloses a method for charging a discharging an electrochemical battery system such as a Li-ion battery system having two cells. The battery discharge is determined based on the state of charge (SOC) thresholds defined in the system. The criteria to discharge the second cell in this system is based on the criteria associated with the first cell, rather than its own status. Australian Patent Application No. AU2018236771B2 describes a multi-source distributed energy storage. However, in such a system, no two groups of sources may be operated at a single time.

Chinese Patent Application No. CN110518667A discloses an echelon to utilize a battery parallel system including a battery module and DC/DC power converter module. In such a battery module, multiple groups of battery packs are parallel with one another, and every group of battery pack is composed of by several battery packs in series, respectively. The battery packs are connected in series to provide a similar voltage in a respective group of battery packs connected in parallel. The system utilizes DC/DC converters and a battery management module in the battery module to control a battery system.

Such a system disclosed in CN110518667A ignored the variety of new or used batteries and existing circulating currents among the series packs. The technique disclosed limits the expansion of such a system into a power grid. A DC-to-DC converter is an electronic circuit or electromechanical device that converts a source of direct current (DC) from one voltage level to another. Additional AC/DC converters are still required if a battery system is connected to a power grid. Adding more DC/DC converters will significantly raise the total DC current and increase hardware requirement on the AC/DC converters if the system such as that disclosed in CN110518667A is connected to a power grid.

The present disclosure provides a controller for controlling discharge of heterogeneous battery packs, a system such as an electrical energy storage system comprising such a controller, methods of using the same, and a method for controlling discharge of a system having a plurality of battery packs. Multiple battery groups can be discharged at the same time. The priority of the discharge and dispatch shares or rates for a plurality of battery packs are determined by the method described herein. Such a method is used to dispatch a plurality of battery packs with heterogeneous health conditions to provide a consistent and long-lasting dispatch profile. The method relies on optimal discharge management of individual battery packs to (A) maintain low charge throughput while maximizing the energy output; (B) reduce stress on the system due to weaker batteries. The managed throughput will lead to improved life and performance through the useful life of the battery.

Power dispatch (discharge) is a function of charge flow and voltage. Dispatch energy is defined as dispatch power over a user-specified period of time. Higher voltage discharge provides higher power compared to low voltage discharge for the same amount of charge flow. Earlier approaches have not considered the impact of voltage on the decision of power or energy dispatch. Moreover, heterogeneity in the voltages of battery packs and voltage trajectory during discharge have not been considered.

The present disclosure provides a controller, a system, and a method to properly utilize heterogeneous batteries such as new batteries from different manufactures or second-use electric vehicle (EV) battery packs in energy storage applications. Every battery pack is operated individually according to its characters such as voltage and voltage gradient. Preselecting or dismantling packs is not required.

One benefit of the invention is to efficiently manage the diversity of battery packs such as new batteries, second use EV battery packs, or combinations thereof in stationary energy storage applications. The length of lives of EV battery packs and overall life the system can be extended. The reliability, stability, and safety of battery energy storage system (BESS) are improved.

The controller, the system, and the methods provided in the present disclosure apply to different battery packs. The battery packs may have the same or different chemistries, same or different performance or degradation, same or different physical and/or electrical performances. In some embodiments, the battery packs are heterogeneous battery packs. References to "heterogeneous battery packs" made herein refer to battery packs or modules having different capacity, state of charge (SOC), state of heath (SOH), and/or voltages, and can be selected from new batteries (e.g., from different manufacturers), second-use electric vehicle (EV) batteries, or combinations thereof. Second-use EV batteries are used for illustration purpose. References to "discharging" from or "charging" to the plurality of battery packs are understood that the plurality of batteries packs collectively discharge or be charged, while it is possible that some battery packs may stay idle (without charging or discharging).

Unless expressly indicated otherwise, references to "state of health (SOH)" made herein will be understood to mean a figure of merit of the condition of a battery, a battery cell, or a battery pack compared to its ideal conditions. SOH is characterized in percentage (%). The condition matching the specifications under the ideal conditions is 100%. SOH may decrease over time and use.

Unless expressly indicated otherwise, "state of charge" (SOC) described herein is defined as a level of charge of an electric battery relative to its capacity. The units of SOC are percentage points, 0% means empty, and 100% means full.

The term "human machine interface (HMI)" used herein is understood to refer to user interface (UI) is the space where interactions between humans and machines occur. A human-machine interface (HMI) may involve interfaces between human and machines with physical input hardware such as keyboards, mice, or any other human interaction based on tactile, visual, or auditory senses. Such user interfaces may include other layers such as output hardware such as computer monitors, speakers, and printers.

The term "energy management system (EMS)" used herein refers to a system of computer-aided tools used by operators of electric utility grids to monitor, control, and optimize the performance of the generation or transmission system.

In the present disclosure, the terms "power demand," "power dispatch," and "power requirement" are used interchangeably, and can be referred to the power needed for either a discharging or a charging process. The terms "converter" and "inverter" can be used interchangeably. Each battery pack includes an inverter and a battery management unit (BMU) therein. For the convenience of description, the term "power inverter" or "AC/DC power converter" is used to describe the internal component in a battery pack, and the term "power converter" or "power conversion system (PCS)" is used to describe the converter connected with one or more battery packs. The term of "battery management unit (BMU)" or "battery management system (BMS)" is used to describe the internal component in a battery pack, and the term "battery power management unit (BPMU)" is used to describe the battery management unit connected with one or more battery packs.

In the present disclosure, the terms "power" and "energy" are used interchangeably, and the energy are described in a unit of time. Energy and power can be converted with time.

Unless expressly indicated otherwise, the term "connected" or "coupled" used herein are understood to encompass different connections or coupling between or among the components so as to conduct electricity or transmit signals for communication. Such a connection or coupling can be through wire, wireless, or cloud-based modes.

Figure 2:
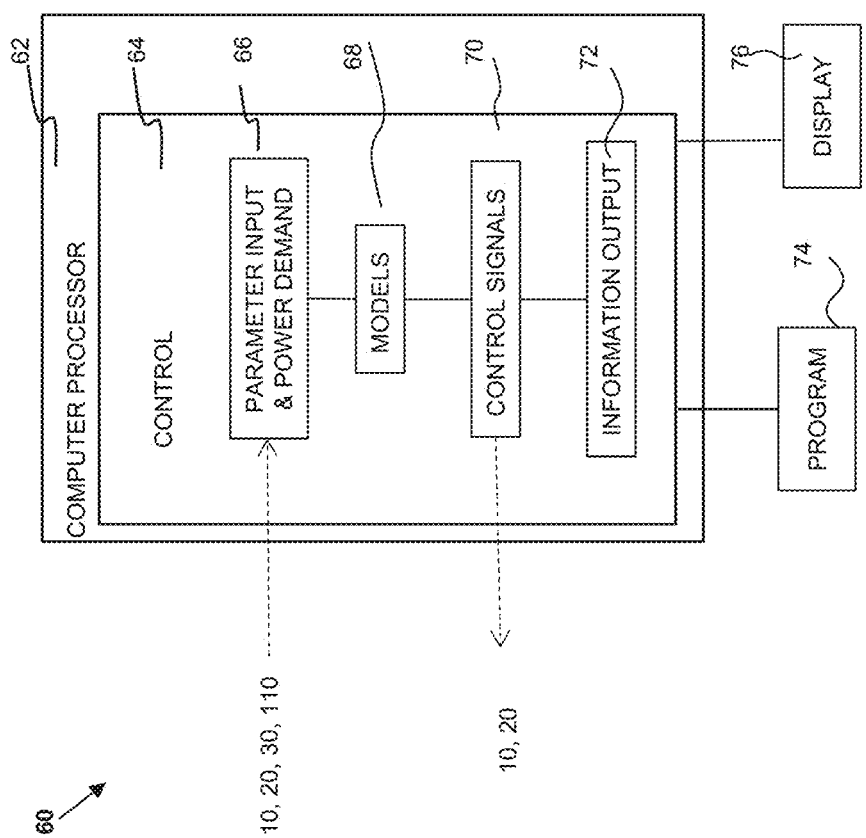
FIG. 2 is a block diagram illustrating an exemplary controller comprising one or more processor and at least one tangible, non-transitory machine readable medium encoded with one or more programs, for controlling discharge of a plurality of heterogeneous battery packs in accordance with some embodiments.
Figure 4:
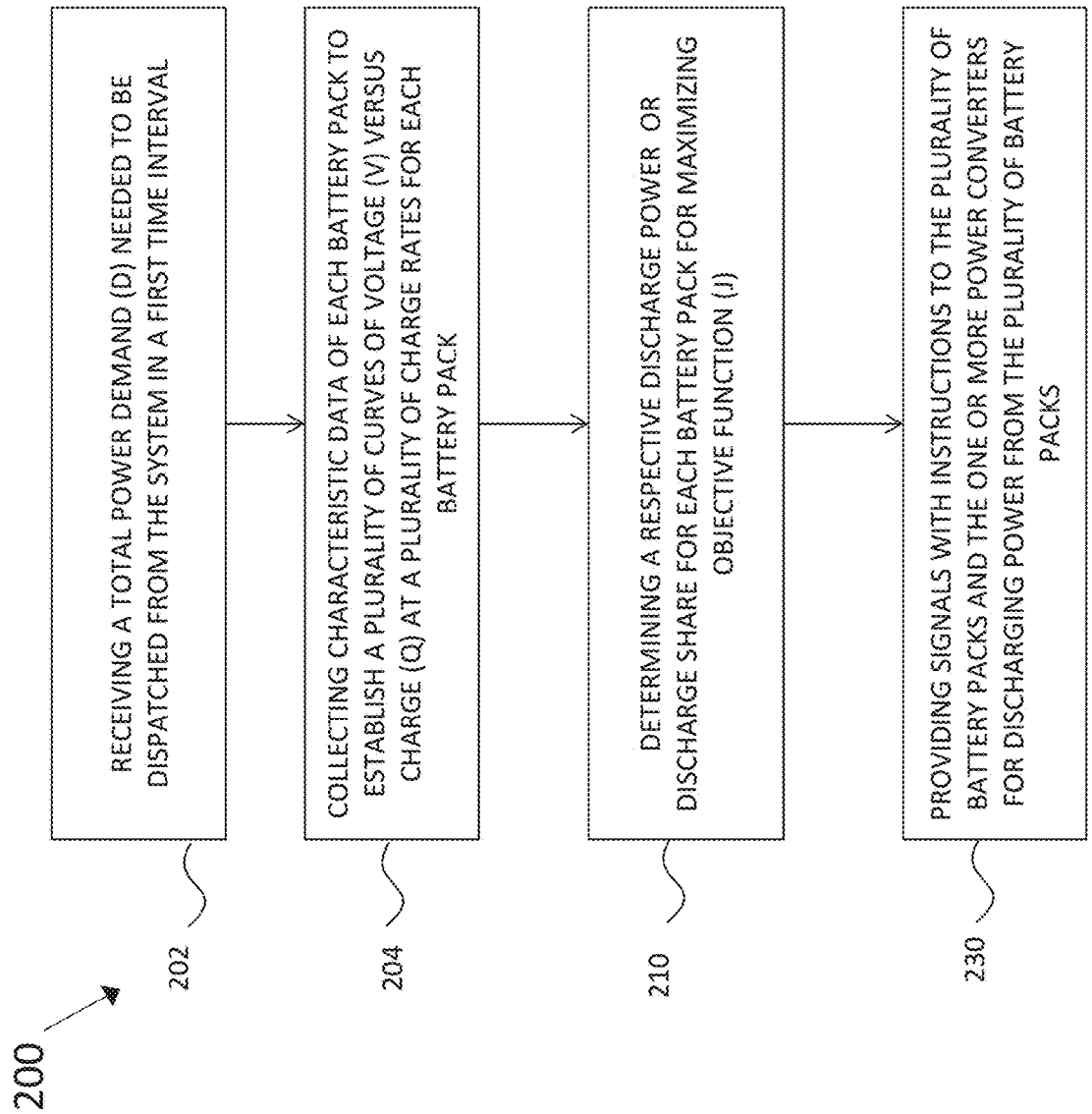
FIG. 4 is a flow chart illustrating an exemplary method for controlling discharge of a plurality of battery packs in accordance with some embodiments.
Figure 5:
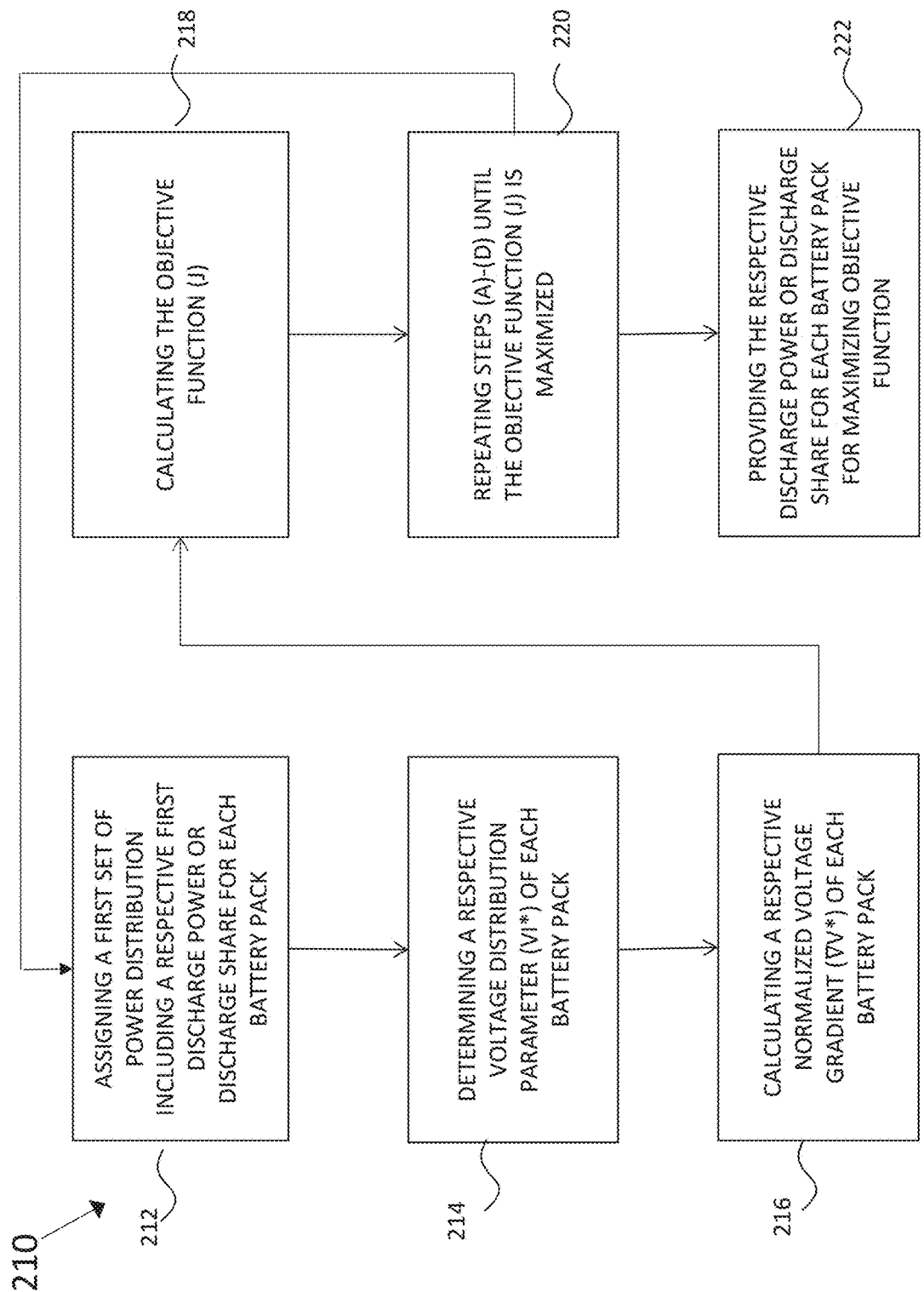
FIG. 5 is a flow chart illustrating an exemplary method for determining a respective discharge power (di) or discharge share ($w_i$) for each battery pack for maximizing objective function (J) of the plurality of battery packs in accordance with some embodiments.

In FIGS. 1-2, like items are indicated by like reference numerals, and for brevity, descriptions of the structure, provided above with reference to the preceding figures, are not repeated. The methods described in FIGS. 4-6 are described with reference to the exemplary structure described in FIGS. 1-2 and the data plots or sketches described in FIG. 3.

Referring to FIG. 1, an exemplary system 100 comprises one or more power converters 10, a plurality of battery packs 20, and a controller 60. The number of each component and the configuration in FIG. 1 are for illustration only. The system may have any suitable number of each component in any suitable combination or configuration.

Each power converter 10 is coupled with at least one of the plurality of battery packs 20, and is configured to convert direct current (DC) from a battery pack to alternating current (AC) or vice versa. The power converter 10 can be also called as power conversion system (PCS) or an inverter.

The controller 60 is coupled to the plurality of battery packs 20 and the one or more power converters 10. In some embodiments, the system may also include more than one controller 60, and each controller 60 is coupled to a plurality of battery packs 20.

The controller 60 may be coupled to the plurality of battery packs 20 directly or indirectly. For example, in some embodiments, the exemplary system 100 may optionally further comprise one or more battery power management unit (BPMU), which can be also called battery management unit (BMU). Each BPMU 30 may be connected with one or more battery packs 20, and is configured to monitor the one or more battery packs 20 and provide characteristic data of the one or more battery packs 20 to the controller 60. In some embodiments, the controller 60 is configured to read the data from each battery pack 20. This may be done through each respective BPMU 30 connected with each battery pack.

The plurality of battery packs 20 are heterogeneous battery packs, which can be selected from new batteries, second-use electric vehicle (EV) batteries, or combinations thereof. The plurality of battery packs 20 are connected in parallel, in series, or in a combination (i.e. hybrid combinations) thereof. In some embodiments, the plurality of battery packs 20 are connected in parallel. No series connection between battery packs eliminates circulating currents and losses.

As shown in FIG. 1, the plurality of battery packs 20 are connected in a parallel configuration 50. In some embodiments, the plurality of battery packs 20 are second-use (i.e. used) electric vehicle (EV) batteries. The used EV batteries can be directly utilized in the system, without pre-selection or dismantling. Each battery pack 20 comprises a battery or batteries. Each battery packs 20 may include an internal battery management unit (BMU), and an internal inverter.

EV battery packs 20 are removed from vehicles and are not disassembled into modules. Simple tests may be done on these EV battery packs 20 to verify their SOH.

In some embodiments, the exemplary system 100 is an electrical energy storage system. The controller 60 is configured to receive a total power demand (D) in a time interval provided from an upper level energy management system (EMS) 110. In some embodiments, the controller 60 is configured to discharge power from the plurality of battery packs 20 in direct current to a grid or load 85 in alternating current. The exemplary system 100 can be used for discharging power from battery packs 20 to a grid 85, or for charging from the grid 85 to battery packs 20. Wire connection 12 may be used. The dotted lines 13 in FIG. 1 illustrates alternative power cables. Multiple power cable topologies may exist between the converter 10 and battery packs 20. The system 100 directly uses grid tied AC/DC converters 10 with flexibility in size expansion. No additional power conversion system is required for grid tied applications.

In some embodiments, the grid 85 is optional. The power can be discharged to other components, in which electrical power is needed.

The controller 60 may be connected with other components in wire or wireless mode. In the exemplary system 100 illustrated in FIG. 1, the controller 60 may be connected with other components such as converter 10, BPMU 30 and EMS 110 via data cable or wireless connection 22. The BPMU 30 may be also connected with battery packs 20 via data cables or wireless connection 22. The controller 60 can work in a cloud-based mode.

Each battery pack 20 may be connected to a power converter 10 (or independent DC port on a converter 10) through a set of automatic DC circuit breakers (not shown), which activate and control the connection between a battery pack 20 and the converter 10. The converter 10 controls whether or not to charge or discharge the single EV battery pack 20 by following the instructions from the controller 60.

Referring to FIG. 2, the controller 60 comprises one or more processors 62 and at least one tangible, non-transitory machine readable medium encoded with one or more programs configured to perform steps as described herein for controlling a discharging process of the system having the plurality of battery packs. The controller 60, the processor 62, and/or the program 74 may be an external device to the converter 10, or be an internal device inside the converter 10.

The processor(s) 62 may include a central control 64, which includes a parameter input module 66, model module 68, a parameter control module 70, and information and instruction module 72. The parameter input module 66 coordinates with the battery packs 20, optionally BPMU 30 and HMI or EMS 110, to read the data from battery packs 20 and power demand from HMI or EMS 110. The parameter input module 66 also coordinates with each power converter 10. The parameter control module 70 coordinates with each power converter 10 and each battery pack 20, and optionally with BPMU 30 and HMI or EMS 110 to control a process of discharging. Together with the one or more programs 74, the model module 68 is configured to perform a simulation based on the input parameters to provide information and instruction to the parameter control module 70 and the information and instruction module 72. The processors 62 may be optionally connected with one or more displays 76 for displaying the information and instructions from module 72 and to an operator.

The controller 60 with the programs 74 and the processor 62 are configured to perform steps for discharging or charging as described herein. As described in FIGS. 4-6, in some embodiments, the controller 60 is configured to perform the steps described herein. Through these steps as described herein, a respective discharge power (di) or discharge share ($w_i$) for each battery pack in a time interval is determined by maximizing objective function (J) of the plurality of battery packs.

In another aspect, the present disclosure provides such a controller 60 for controlling discharge of the exemplary system 100 comprising a plurality of battery packs 20. As described herein, such a controller 60 comprises one or more processor 62 and at least one tangible, non-transitory machine readable medium encoded with one or more programs 74 configured to perform the steps as described herein. The controller 60 is configured to perform the steps as described herein to determine a respective discharge power (di) or discharge share ($w_i$) for each battery pack for maximizing objective function (J) of the plurality of battery packs.

The controller 60 is configured to provide signals with instructions to the plurality of battery packs 20 and the one or more power converters 10 for discharging power from the plurality of battery packs 20 based on the respective discharge power or share of each battery pack 20 and/or keeping a certain battery pack idle. The controller 60 is also configured to dynamically control discharging of the plurality of battery packs 20 by updating the respective discharging share or power of each battery pack instantaneously with time.

The plurality of battery packs 20, which the controller 60 is configured to be coupled with, are heterogeneous battery packs selected from new batteries, second-use electric vehicle (EV) batteries, or combinations thereof. The plurality of battery packs 20 are connected in parallel, in series, or in a combination thereof. The plurality of battery packs 20 are connected in parallel in some embodiments. The controller 60 is configured for controlling discharge of heterogeneous battery packs 20, for example, in an electrical energy storage system. In some embodiments, the power needed is discharged from the plurality of battery packs 20 to a grid or load 85 according to the instructions from the controller 60.

Different battery packs, especially second life or used batteries or batteries that have different capacities and ratings, have varying voltage-charge characteristics. The controller 60 and the method in the present disclosure biases the discharge to battery packs with higher voltage. This guarantees higher power dispatch for same charge throughput while making it easier to satisfy the dispatch command passed on to a battery pack management system. Measured voltage during dispatch can be used to expedite/delay or stop discharge.

Figure 3:
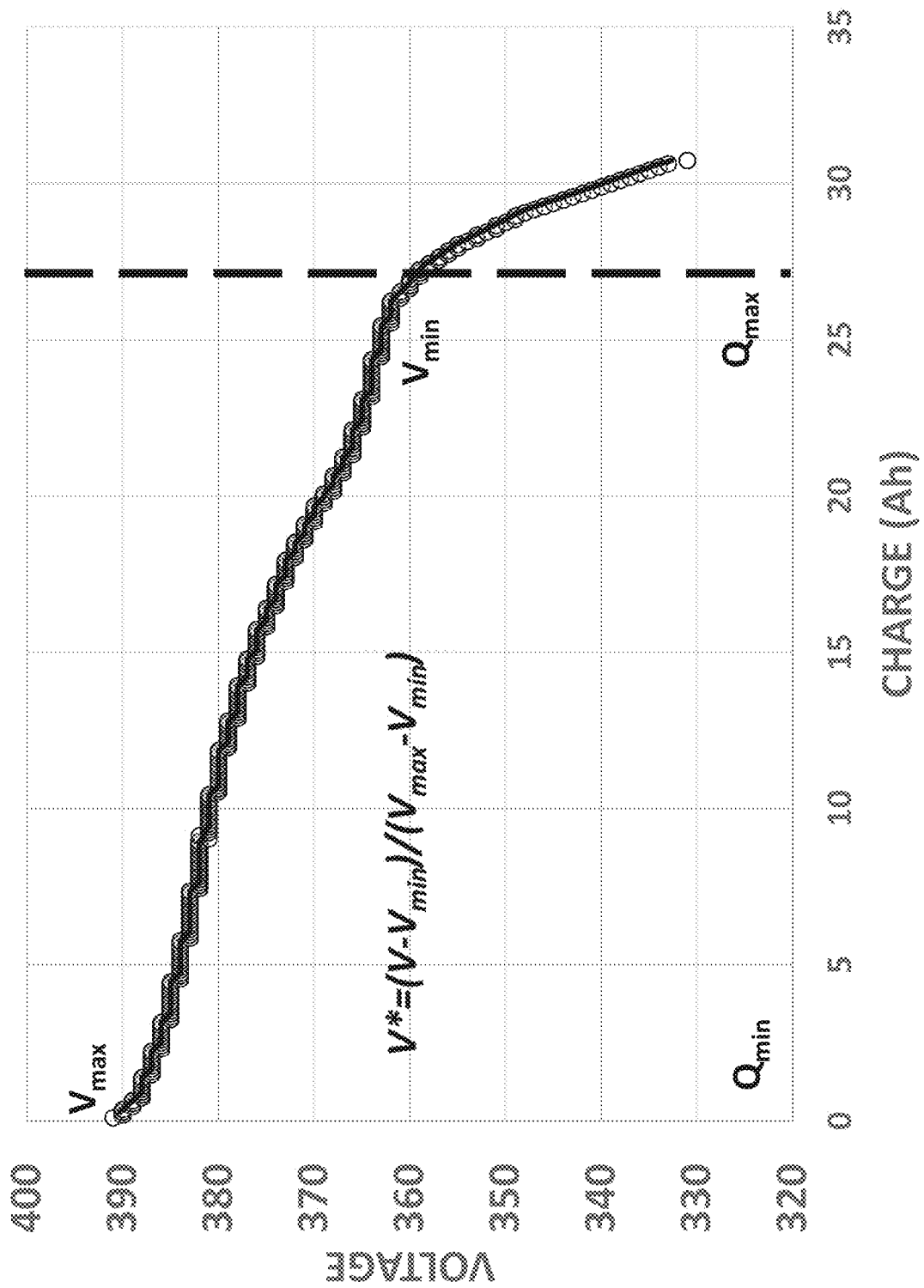
FIG. 3 shows the relationship between voltage (V) and charge flow (Ah) of an exemplary battery pack in some embodiments.

Referring to FIG. 3, an exemplary curve of voltage with charge flow of an exemplary battery pack 20 during a discharging process at a charging rate is shown. The input parameter may include voltage, current and time. Charge or charge flow (Q) is calculated from the current flow and the time elapsed. The voltage has a unit of volt (v), and the charge flow has a unit of Amp*hour (Ah) or coulomb. As shown in FIG. 3, Vmax is the voltage of such a battery pack when it is fully charged or it is at its maximum allowable charge level. Vmin is the voltage of such a battery pack when it is depleted of charge or it reaches its minimum allowable charge level.

The curve of voltage versus charge can be empirically generated at constant level of discharge while monitoring the current flow over the discharge period until the voltage drops beyond a user-defined minimum limit (Vmin), shown by the vertical dotted line in FIG. 3. The current and the voltage follow the same or similar trend with increase in charging time. In some embodiments, the curves of voltage versus charge are empirically generated at constant level of discharge while monitoring the current flow over the discharge period until the voltage drops beyond a user-defined minimum limit, shown by the intersection of the dotted vertical line with horizontal line from the y-axis.

Different discharge rates may yield different voltage discharge curves for the same battery packs. A family of curves at different discharge rates can be provided for each respective battery pack 20, and can be used to track the voltage trajectory of the packs for a given dispatch episode. In some embodiments, a technique such as extrapolation, interpolation, or averaging is used to get a representative curve. In one curve, when the voltage decreases beyond Vmin during discharge, such a battery pack shows a significantly higher voltage gradient and depletes more quickly. This lower limit point can be also referred as voltage collapse. In some embodiments, Vmax and Vmin are open circuit voltage specified by manufacturer or derived from pre-determined voltage-charge curves. The range of from Vmin to Vmax may be in a range of from 400 volts to 1,000 volts.

The magnitude of voltage may be represented in the form of a normalized voltage, for example, a voltage distribution parameter ($V^*$). A voltage distribution parameter $V^*$ of a battery pack 20 having a present voltage (V) is defined as (V−Vmin)/(Vmax−Vmin). The higher the parameter, the higher degree this battery pack is capable of for further discharge. The voltage distribution parameter $V^*$ can be in a range of from 0-1 or 0-100% in percentage (e.g., in a range of 50-95%).

Heterogeneous battery packs 20 have varying voltage-charge-time characteristics. For most battery chemistries, healthy batteries show little drop in voltage during normal window of charging or discharging. Therefore, a drop in voltage during discharging process, for example, the voltage-charge gradient, can be an indication of health issues. In one embodiment, a method can rely on using the voltage drop during discharge process to dynamically assess the health of battery pack and utilize this voltage-charge gradient to bias the dispatch from each pack. The algorithm biases the discharge to battery packs that show lower voltage-over-charge gradient. In other words, the gradient of battery voltage can be minimized for all battery packs. For a battery pack, the voltage-charge gradient ($\nabla V_i$) or called the voltage gradient is defined by Equation (6):

$$\nabla V_i = (\Delta V_i / \Delta Q_i) \quad (6).$$

$\Delta Q_i$ is the discharge from $i^{th}$ battery pack and $\Delta V_i$ is its resulting voltage drop. The sum of the voltage drop for all battery packs added together can be minimized in some embodiments. Reduced throughput will lead to improved life and performance through the useful life of the battery. Additionally, this guarantees better stability for same charge throughput while making it easier to satisfy the dispatch command passed on to pack management system.

Similar to normalized voltage or voltage distribution parameter ($V^*$), charge (Q) can be also normalized with respect to the difference between maximum and minimum charge. The normalized charge is represented in $Q^*$. A normalized voltage-charge gradient or called voltage gradient ($\nabla V_i^*$) of a battery pack is defined in Equation (7):

$$(\nabla V^*) = |V_1^* - V_2^*|/|Q_1^* - Q_2^*| \quad (7).$$

Based on the definition of $V^*$ and $Q^*$, the normalized voltage-charge gradient can be calculated according to Equation (5) described above in some embodiments:

$$(\nabla V^*) = (|V_1 - V_2|/|V_{max} - V_{min}|)/(|Q_1 - Q_2|/|Q_{max} - Q_{min}|) \quad (5),$$

wherein $V_1$, $V_2$, $Q_1$, and $Q_2$ are voltage and charge at a first point and a second point of a respective curve of voltage versus charge.

The gradient ($\nabla V$) of voltage (V) with charge flow (Ah) can be calculated by $(\nabla V) = |V_1 - V_2|/|Q_1 - Q_2|$. Higher voltage gradient ($\nabla V$) indicates deeper impact on health of a battery pack while lower gradient indicates a healthy battery pack. During each iteration a suitable gradient is determined while operating around a certain voltage. Higher voltage is indicative of higher State of Charge (SOC). Lower gradient is indicative of a discharge process that is favorable to battery's long-term health. Combining both these attributes create an objective function (J) as defined in Equation (1). The objective function can be maximized to design a process that is the right tradeoff between performance and long term health of the battery.

Referring to FIGS. 4-5, the present disclosure also provides a method 200 for controlling discharge of a system 100 comprising a plurality of battery packs 20 through a controller 60 therein as described herein. Such a method is used to dispatch battery packs with heterogeneous health conditions to provide a consistent and long-lasting dispatch profile. The managed throughput leads to improved life and performance through the useful life of the battery packs.

FIG. 4 illustrates an exemplary method 200 for controlling discharge of a plurality of battery packs 20 in a system 100 in accordance with some embodiments. The plurality of battery packs 20 are heterogeneous battery packs selected from new batteries, second-use electric vehicle (EV) batteries, or combinations thereof. The plurality of battery packs 20 are connected in parallel, in series, or in a combination thereof. The plurality of battery packs 20 are connected preferably in parallel.

Referring to FIG. 4, at step 202, a total power demand (D) needed to be dispatched from the system 100 at a first time interval is received by the controller 60 or calculated by the controller based on the information received from EMS 110. As described herein, a total power demand may be received from EMS 110. The time interval can be any period of time, for example, 15 minutes.

At step 204, characteristic data of each battery pack 20 are collected to establish a plurality of curves of voltage (V) versus charge (Q) at a plurality of discharge rates for each battery pack (i). Each curve of voltage versus charge corresponds to a respective discharge rate for a respective battery pack. An exemplary curve is shown in FIG. 3 as described above. The voltage versus charge (amp-hr) characteristics of each battery pack may be empirically obtained or derived for a set of frequently encountered discharge rates. This provides a family of curves that can be used to track the voltage trajectory of the packs for a given dispatch episode. The plurality of discharge rates can be the discharge rate frequently used. The characteristic data of each battery pack include a maximum voltage ($V_{i\ max}$), a minimum voltage for discharge ($V_{i\ min}$), a maximum discharge ($Q_{i\ max}$) and a minimum discharge ($V_{i\ min}$) at a respective discharge rate. The characteristic data of each battery pack also include a maximum total rated power ($d_{i\,max}$), state of charge ($SOC_i$) and a present voltage ($V_i$).

At step 210, a respective discharge power (di) or discharge share ($w_i$) for each battery pack 20 is determined based on the criterion for maximizing objective function (J) of the plurality of battery packs 20 defined in Equation (1):

$$J = \sum_i^n \alpha V_i^* + \sum_i^n (1-\alpha) \cdot SOC_i \cdot (\nabla V_i^*)^{-1}. \quad (1)$$

In Equation (1), n is a total number of the plurality of battery packs 20 in the system. $V_i^*$ is a voltage distribution parameter of each battery pack 20 determined using Equation (2):

$$V_i^* = (V_i - V_{i\,min})/(V_{i\,max} - V_{i\,min}) \quad (2).$$

$\nabla V_i^*$ is a normalized voltage gradient in a respective curve of voltage versus charge normalized by ($V_{i\,max} - V_{i\,min}$) and ($Q_{i\,max} - Q_{i\,min}$), for example, as defined in Equation (5), and α is a weighting factor in a range of from 0 to 1 assigned between voltage and voltage gradient. The weighting factor α, which can be predetermined in the method, can be in any suitable range, for example, in a range of from 0.05 to 0.95. The weighting factor (α) can be 0.1, 0.2, 0.3, 0.4, 0.5, 0.6, 0.7, 0.8, 0.9, or any suitable pre-determined number. In some embodiments, the weighting factor (α) may be selected based on the level of aggressiveness of the service. If the service desired is aggressive (i.e., discharging battery packs more often to lower state of charge, with more cost saving because of reduction of power draw from the grid), the weighting factor (α) may be reduced, for example, having the weighting factor (α) less than 0.5. If the service desired is more conservative (i.e., discharging the battery packs less frequently to keep the SOC levels, for example, around 50%, and targeting to have longer life of the battery packs), the weighting factor (α) can be increased, for example, having the weighting factor (α) higher than 0.5. The objective function (J) may be in a range of from 0 to 1. In some embodiments, the objective function may be preferably equal or close to 1 if possible, or any possible highest value that can be achieved by using the method on a system.

One objective is to establish a method for dispatch of a plurality of battery packs based on optimal voltage and charge characteristics. Battery voltage provides an accurate estimate of the state of charge of the battery pack and its ability to supply energy. Voltage gradient reflects the battery impedance and should be minimized as much as possible. Packs that are higher voltage and lower impedance are dispatch to provide higher energy than packs at lower voltage. The open circuit voltage measurement is a direct method to understand the battery performance along the voltage-charge curve.

Referring to FIG. 5, in some embodiments, at step 210, a respective discharge power (di) or discharge share ($w_i$) for each battery pack for maximizing objective function (J) of the plurality of battery packs can be obtained through a method comprising steps 212, 214, 216, 218, 220, and 220.

At step 212, a first set of power distribution is assigned. The power distribution includes a respective first discharge power or discharge share for each battery pack. These are only the initial values for evaluation purpose. The assigned first discharge power or discharge share for each battery pack may correspond to one specific discharge rate and a specific V-Q curve for the respective battery pack. The related characteristic data at the respective discharge rate can be used accordingly.

At step 214, a respective voltage distribution parameter ($V_i^*$) of each battery pack 20 is determined based on $V_{i\,max}$, $V_{i\,min}$, and $V_i$ at a corresponding discharge rate based on Equation (2).

In some embodiments, a respective discharge power or discharge share for each battery pack is assigned or calculated based on either or both of Equation (3) and Equation (4):

$$w_i = \frac{d_{i,max} \cdot V_i^*}{\sum d_{i,max} \cdot V_i^*}; \quad (3)$$

and $$d_i = w_i D \quad (4).$$

Step 212 and step 214 may be performed at the same time, or step 212 may be performed after step 214. In some embodiments, the first respective discharging share ($w_i$) of each battery pack is calculated based on the voltage distribution parameter ($V_i^*$) and the maximum total rated power ($d_{i\,max}$) for each and every battery pack using Equation (3). The respective power for discharging (di) can be calculated a respective share and the total power demand based on Equation (4). The discharge share at a time interval can be converted into a discharging rate.

At step 216, a respective normalized voltage gradient ($\nabla V_i^*$) of each battery pack 20 is calculated based on a respective curve of voltage versus charge at the corresponding discharge rate. In some embodiments, a respective normalized voltage gradient ($\nabla V_i^*$) of each battery pack 20 is calculated according to Equation (5):

$$(\nabla V^*) = (|V_1 - V_2|/|V_{max} - V_{min}|)/(|Q_1 - Q_2|/|Q_{max} - Q_{min}|) \quad (5),$$

wherein $V_1$, $V_2$, $Q_1$, and $Q_2$ are voltage and charge at a first point and a second point of a respective curve of voltage versus charge. The first point and the second point can be the starting point and the ending point of discharging based on the assumptions and the assignment made in step 212.

At step 218, the objective function (J) of the plurality of battery packs is calculated according to Equation (1). This is a first value of J based on the assumptions and the assignment made at step 212.

At step 220, steps 212, 214, 216, and 218, which are steps (a), (b), (c) and (d), are repeated until the objective function (J) is maximized. A second set of power distribution including a respective second discharge power or discharge share for each battery pack can be assigned. The second set of power distribution is different from the first set of power distribution. The second value of J is calculated.

Through cycles of these steps, a maximum objective function (J) and the corresponding conditions can be obtained. Maximization is implied or achieved if the objective function (J) can increase no more, i.e. either asymptotes or starts dropping. Mathematically the first partial derivative of J with respect to all the input variables changes sign from +ve to −ye. No maximum threshold can be specified to work over the whole range of battery operations. The maximum is irrespective of the optimization algorithm used such as the steepest gradient and interior point.

At step 222, the data of the respective discharge power (di) or discharge share ($w_i$) for each battery pack for maximizing objective function (J) of the plurality of battery packs are provided or output. These data are selected from different sets of power distribution from step 212, but are the set that provides the maximum objective function.

Referring back to FIG. 4, at step 230, signals with instructions are provided from the controller 60 to the plurality of battery packs 20 and the one or more power converters 10 for discharging power from the plurality of battery packs 20 based on the respective discharge power of each battery pack and/or keeping a certain battery pack idle. In some embodiments, instructions are sent from the controller to each battery pack and/or one or more converter connected with the plurality of battery packs for discharging based on the respective discharging share of each battery pack. Power from the plurality of battery packs 20 is discharged according to the instructions.

When the calculated discharging power or share of a certain battery pack is about zero, or such a battery pack cannot be used to discharge to meet the required conditions because its voltage is the same as or below its minimum voltage for discharging (i.e., having a voltage collapse), the specific battery pack is kept idle without discharging. Such a battery pack may need to be charged first or replaced.

The respective discharging share ($w_i$) and the respective power discharge (di) of each and every battery pack can be summarized in a table or a chart, which can be shown in display 76.

For the plurality of battery packs (n packs in total) in a system, the total sum of the discharge shares is equal to 1 as shown in Equation (7):

$$1 = \sum_{i=1}^{n} w_i \qquad (7)$$

The power is discharged from the plurality of battery packs 20 to meet the requirement of the total power demand (D) in the first time interval.

Referring to FIG. 4, in some embodiments, steps 202, 204, 210 and 230 of the method 200 can be repeated at a second (next) time interval. The first or second interval can be defined by a user. For example, the time interval may be any time length from 10 second to 2 hours, for example, 1 minute, 2 minutes, 5 minutes, 10 minutes, 15, minutes, 30 minutes, or one hour. The controller 60 re-assigns dispatch (discharge) for the plurality of battery packs after the time interval ends or when a voltage collapse occurs to a battery pack, by repeating some or all of the steps in FIGS. 4 and 5. In some embodiments, the discharging process of the plurality of battery packs 20 is dynamically controlled by updating the respective discharging share or power of each battery pack 20 instantaneously with time. The time interval is minimal.

As defined in Equation (1), the objective function comprises a voltage component, a SOC component, and a voltage gradient component. The model constraints include total dispatch (D) needed (i.e. the sum of power discharge for all battery packs, characteristic curves for each battery pack at different discharging rates, and a maximum dispatch capacity of each battery pack. During implementation, rolling optimization is implemented over a receding horizon. The term "horizon" means a rolling period of time over which the battery packs are operated. As shown in FIGS. 6A-6B, the rolling optimization could include past time intervals to maximize the objective function over a horizon (i.e. window). FIGS. 6A-6B illustrate general steps (FIG. 6A) for dynamically controlling discharge of battery packs in different time intervals (FIG. 6B) in some embodiments. FIGS. 6A-6B illustrate the exemplary method described in FIGS. 4-5. In FIG. 6B, each bracket illustrates a time interval or time window, which is called a horizon.

Referring to FIG. 6A, at step 302, which is the same as step 202 in FIG. 4, the dispatch level is obtained. The dispatch level is the total power demand (D) to be dispatched from the system in a time interval.

At step 304, which is the same as step 204 in FIG. 4, characteristic data and curves of each battery pack (n packs in total) are collected.

At step 306, which includes steps 212, 214, and 216 in FIG. 5, normalized variables and equations at one horizon (i.e. a first time interval or time window) are established. For example, the normalized variables includes a respective voltage distribution parameter ($V_i^*$) and normalized voltage gradient of each battery pack. These parameters are used for calculation of the objective function (J) in step 218 in FIG. 5.

At step 308, which is the same as step 210 in FIG. 4 and includes at least steps 218 and 220 in FIG. 5, the objective function is maximized for the first time interval.

At step 310, the respective discharge power or share of each battery pack for maximizing the objective function is assigned for the first time interval. The system are then discharged according. When this first time window passes, the program moves onto a second time interval (i.e. from one bracket to a next bracket in FIG. 6B). As shown in FIG. 6A, the steps in FIG. 6A are repeated again for another cycle.

After the dispatch power requirement is provided by the controller 60 for a user-defined time interval (e.g., the first time interval), the converter 10 dispatches the battery packs 20 at various power levels for the user-defined time interval. In case of voltage collapse or other events, the affected battery pack is removed from the active plurality of battery packs. The individual pack dispatch power is determined by the method described above including maximizing the objective function as calculated using Equation (1). Time correction can also be applied to throttle/expedite or stop discharge, in case of unforeseen issues. Even if a battery pack is large, its dispatch power may be low due to lower voltage. While the dispatch energy from a smaller battery may be higher if its voltage is higher. In any case, the algorithm will ensure that the maximum dispatch capacity of each pack ($d_{i,max}$) is never violated.

In an alternate approach, at step 204, open circuit voltage of each battery pack, either measured or obtained from calibrated curves can be also used to provide power dispatches. At step 214, in some embodiments, in case of large drops in voltages, pack-specific time constraints may be used to force certain packs to dispatch at faster/slower rate or stop discharge. To reduce the sudden changes in dispatch distribution within battery packs due to voltage variations, $w_i$ can be calculated using window averaging using Equation (8), instead of instantaneously:

$$w_i = \overline{w_i} \qquad (8).$$

To reduce fluctuations due to fast moving voltage curve, window averaging can be applied to calculate average voltages. A predefined horizon can be used in the optimization formulation, to prevent short term fluctuations.

The system, the controller, and the method provided in the present disclosure offer many advantages. For example, a variety of battery packs such as used EV battery packs having different quality can be used. No pre-selection or dismantle of the battery packs are needed. If one pack and/or one converter fails to response, the system still has capability to supply power load to satisfy the power demand. The system, the controller, and the method extend the life of each battery packs, and they also offer flexibility in maintaining and upgrading the system as well.

The present disclosure also provides at least one tangible, non-transitory machine readable medium encoded with one or more programs for the controller as described above.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods. The computer or the control unit may be operated remotely using a cloud based system.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
   a plurality of battery packs;
   one or more power converters, each power converter coupled with at least one of the plurality of battery packs and configured to convert direct current (DC) from one battery pack to alternating current (AC) or vice versa; and
   a controller coupled to the plurality of battery packs and the one or more power converters, the controller comprising one or more processor and at least one tangible, non-transitory machine readable medium encoded with one or more programs configured to perform steps of:
      receiving a total power demand (D) needed to be dispatched from the system in a first time interval;
      collecting characteristic data of each battery pack to establish a plurality of curves of voltage (V) versus charge (Q) at a plurality of discharge rates for each battery pack (i), each curve of voltage versus charge corresponding to a respective discharge rate for a respective battery pack, the characteristic data of each battery pack including a maximum voltage ($V_{i\ max}$), a minimum voltage for discharge ($V_{i\ min}$), a maximum discharge ($Q_{i\ max}$) and a minimum discharge ($V_{i\ min}$) at a respective discharge rate, a maximum total rated power ($d_{i\ max}$), state of charge ($SOC_i$) and a present voltage ($V_i$);
      determining a respective discharge power (di) or discharge share ($w_i$) for each battery pack for maximizing objective function (J) defined in Equation (1):

$$J = \sum_{i}^{n} \alpha V_i^* + \sum_{i}^{n} (1-\alpha) \cdot SOC_i \cdot (\nabla V_i^*)^{-1}, \quad (1)$$

wherein
n is a total number of the plurality of battery packs,
$V_i^*$ is a voltage distribution parameter of each battery pack determined using Equation (2):

$$V_i^* = (V_i - V_{i\ min})/(V_{i\ max} - V_{i\ min}) \quad (2),$$

$\nabla V_i^*$ is a normalized voltage gradient in a respective curve of voltage versus charge normalized by ($V_{i\ max} - V_{i\ min}$) and ($Q_{i\ max} - Q_{i\ min}$), and $\alpha$ is a weighting factor in a range of from 0 to 1 assigned between voltage and voltage gradient; and
providing signals with instructions to the plurality of battery packs and the one or more power converters for discharging power from the plurality of battery packs based on the respective discharge power (di) or discharge share ($w_i$) of each battery pack and/or keeping a certain battery pack idle.

2. The system of claim 1, wherein the controller is configured to determine a respective discharge power (di) or discharge share ($w_i$) for each battery pack for maximizing objective function (J) through steps of:
   (a) assigning a first set of power distribution including a respective first discharge power or discharge share for each battery pack;
   (b) determining a respective voltage distribution parameter ($V_i^*$) of each battery pack based on $V_{i\ max}$, $V_{i\ min}$, and $V_i$ at a corresponding discharge rate based on Equation (2);
   (c) calculating a respective normalized voltage gradient ($\nabla V_i^*$) of each battery pack based on a respective curve of voltage versus charge at the corresponding discharge rate;
   (d) calculating the objective function (J);
   (e) repeating steps (a)-(d) until the objective function (J) is maximized, by assigning a second set of power distribution including a respective second discharge power or discharge share for each battery pack, the second set of power distribution different from the first set of power distribution; and
   (f) providing the respective discharge power (di) or discharge share ($w_i$) for each battery pack for maximizing objective function (J).

3. The system of claim 2, wherein a respective discharge power or discharge share for each battery pack is assigned or calculated based on either or both of Equation (3) and Equation (4):

$$w_i = \frac{d_{i,max} \cdot V_i^*}{\sum d_{i,max} \cdot V_i^*}; \quad (3)$$

and $$d_i = w_i D \quad (4).$$

4. The system of claim 2, wherein a respective normalized voltage gradient ($\nabla V_i^*$) of each battery pack is calculated based on Equation (5):

$$(\nabla V^*)=(|V_1-V_2|/|V_{max}-V_{min}|)/(|Q_1-Q_2|/|Q_{max}-Q_{min}|) \quad (5),$$

wherein $V_1$, $V_2$, $Q_1$, and $Q_2$ are voltage and charge at a first point and a second point of a respective curve of voltage versus charge.

5. The system of claim 1, wherein the plurality of battery packs are heterogeneous battery packs selected from new batteries, second-use electric vehicle (EV) batteries, or combinations thereof, and the plurality of battery packs are connected in parallel, in series, or in a combination thereof.

6. The system of claim 1, further comprising one or more battery power management unit (BPMU), each BPMU connected with one or more battery packs and configured to monitor the one or more battery packs and provide characteristic data of the one or more battery packs to the controller.

7. The system of claim 1, wherein the system is an electrical energy storage system, and the total power demand is provided from an upper level energy management system.

8. A controller for controlling discharge of a system comprising a plurality of battery packs, comprising one or more processor and at least one tangible, non-transitory machine readable medium encoded with one or more programs configured to perform steps of:

receiving a total power demand (D) needed to be dispatched from the system in a first time interval;

collecting characteristic data of each battery pack to establish a plurality of curves of voltage (V) versus charge (Q) at a plurality of discharge rates for each battery pack (i), each curve of voltage versus charge corresponding to a respective discharge rate for a respective battery pack, the characteristic data of each battery pack including a maximum voltage ($V_{i\ max}$), a minimum voltage for discharge ($V_{i\ min}$), a maximum discharge ($Q_{i\ max}$) and a minimum discharge ($V_{i\ min}$) at a respective discharge rate, a maximum total rated power ($d_{i\ max}$), state of charge ($SOC_i$) and a present voltage ($V_i$);

determining a respective discharge power (di) or discharge share ($w_i$) for each battery pack for maximizing objective function (J) defined in Equation (1):

$$J = \sum_i^n \alpha V_i^* + \sum_i^n (1-\alpha) \cdot SOC_i \cdot (\nabla V_i^*)^{-1}, \quad (1)$$

wherein n is a total number of the plurality of battery packs, $V_i^*$ is a voltage distribution parameter of each battery pack determined using Equation (2):

$$V_i^*=(V_i-V_{i\ min})/(V_{i\ max}-V_{i\ min}) \quad (2),$$

$\nabla V_i^*$ is a normalized voltage gradient in a respective curve of voltage versus charge normalized by ($V_{i\ max}-V_{i\ min}$) and ($Q_{i\ max}-Q_{i\ min}$), and $\alpha$ is a weighting factor in a range of from 0 to 1 assigned between voltage and voltage gradient; and providing signals with instructions to the plurality of battery packs and the one or more power converters for discharging power from the plurality of battery packs based on the respective discharge power (di) or discharge share ($w_i$) of each battery pack and/or keeping a certain battery pack idle.

9. The controller of claim 8, wherein the controller is configured to determine a respective discharge power (di) or discharge share ($w_i$) for each battery pack for maximizing objective function (J) through steps of:

(a) assigning a first set of power distribution including a respective first discharge power or discharge share for each battery pack;

(b) determining a respective voltage distribution parameter ($V_i^*$) of each battery pack based on $V_{i\ max}$, $V_{i\ min}$, and $V_i$ at a corresponding discharge rate based on Equation (2);

(c) calculating a respective normalized voltage gradient ($\nabla V_i^*$) of each battery pack based on a respective curve of voltage versus charge at the corresponding discharge rate;

(d) calculating the objective function (J);

(e) repeating steps (a)-(d) until the objective function (J) is maximized, by assigning a second set of power distribution including a respective second discharge power or discharge share for each battery pack, the second set of power distribution different from the first set of power distribution; and (f) providing the respective discharge power (di) or discharge share ($w_i$) for each battery pack for maximizing objective function (J).

10. The controller of claim 8, wherein the plurality of battery packs are heterogeneous battery packs selected from new batteries, second-use electric vehicle (EV) batteries, or combinations thereof, and the plurality of battery packs are connected in parallel, in series, or in a combination thereof.

11. The controller of claim 8, wherein the controller is configured to repeat the steps to re-determine the respective power discharge for each battery pack in a second time interval after the first time interval ends.

12. The controller of claim 8, wherein the controller is configured to discharge power from the plurality of battery packs to a grid or load.

13. A method for controlling discharge of a system comprising a plurality of battery packs through a controller therein, comprising:

receiving a total power demand (D) needed to be dispatched from the system in a first time interval;

collecting characteristic data of each battery pack to establish a plurality of curves of voltage (V) versus charge (Q) at a plurality of discharge rates for each battery pack (i), each curve of voltage versus charge corresponding to a respective discharge rate for a respective battery pack, the characteristic data of each battery pack including a maximum voltage ($V_{i\ max}$), a minimum voltage for discharge ($V_{i\ min}$), a maximum discharge ($Q_{i\ max}$) and a minimum discharge ($V_{i\ min}$) at a respective discharge rate, a maximum total rated power ($d_{i\ max}$), state of charge ($SOC_i$) and a present voltage ($V_i$);

determining a respective discharge power (di) or discharge share ($w_i$) for each battery pack for maximizing objective function (J) defined in Equation (1):

$$J = \sum_i^n \alpha V_i^* + \sum_i^n (1-\alpha) \cdot SOC_i \cdot (\nabla V_i^*)^{-1}, \quad (1)$$

wherein n is a total number of the plurality of battery packs, $V_i^*$ is a voltage distribution parameter of each battery pack determined using Equation (2):

$$V_i^* = (V_i - V_{i\,min})/(V_{i\,max} - V_{i\,min}) \quad (2),$$

$\nabla V_i^*$ is a normalized voltage gradient in a respective curve of voltage versus charge normalized by $(V_{i\,max} - V_{i\,min})$ and $(Q_{i\,max} - Q_{i\,min})$, and $\alpha$ is a weighting factor in a range of from 0 to 1 assigned between voltage and voltage gradient; and providing signals with instructions to the plurality of battery packs and the one or more power converters for discharging power from the plurality of battery packs based on the respective discharge power (di) or discharge share ($w_i$) of each battery pack and/or keeping a certain battery pack idle.

14. The method of claim 13, wherein the step of determining a respective discharge power (di) or discharge share ($w_i$) for each battery pack for maximizing objective function (J) comprises steps of:

(a) assigning a first set of power distribution including a respective first discharge power or discharge share for each battery pack;

(b) determining a respective voltage distribution parameter ($V_i^*$) of each battery pack based on $V_{i\,max}$, $V_{i\,min}$, and $V_i$ at a corresponding discharge rate based on Equation (2);

(c) calculating a respective normalized voltage gradient ($\nabla V_i^*$) of each battery pack based on a respective curve of voltage versus charge at the corresponding discharge rate;

(d) calculating the objective function (J);

(e) repeating steps (a)-(d) until the objective function (J) is maximized, by assigning a second set of power distribution including a respective second discharge power or discharge share for each battery pack, the second set of power distribution different from the first set of power distribution; and (f) providing the respective discharge power (di) or discharge share ($w_i$) for each battery pack for maximizing objective function (J).

15. The method of claim 14, wherein a respective discharge power or discharge share for each battery pack is assigned or calculated based on either or both of Equation (3) and Equation (4):

$$w_i = \frac{d_{i,max} \cdot V_i^*}{\sum d_{i,max} \cdot V_i^*}; \quad (3)$$

and $$d_i = w_i D \quad (4).$$

16. The method of claim 14, wherein a respective normalized voltage gradient ($\nabla V_i^*$) of each battery pack is calculated based on Equation (5):

$$(\nabla V^*) = (|V_1 - V_2|/|V_{max} - V_{min}|)/(|Q_1 - Q_2|/|Q_{max} - Q_{min}|) \quad (5),$$

wherein $V_1$, $V_2$, $Q_1$, and $Q_2$ are voltage and charge at a first point and a second point of a respective curve of voltage versus charge.

17. The method of claim 13, wherein the plurality of battery packs are heterogeneous battery packs selected from new batteries, second-use electric vehicle (EV) batteries, or combinations thereof, and the plurality of battery packs are connected in parallel, in series, or in a combination thereof.

18. The method of claim 13, wherein a certain battery pack idle is kept in idle when the respective discharge power (di) or discharge share ($w_i$) for such a battery pack is zero or the present voltage ($V_i$) of such a battery pack is lower than its minimum voltage for discharge ($V_{i\,min}$).

19. The method of claim 13, wherein power is discharged from the plurality of battery packs to a grid or load.

20. The method of claim 13, further comprising: repeat the steps to re-determine the respective power discharge for each battery pack in a second time interval after the first time interval ends.

\* \* \* \* \*